Figure 1:
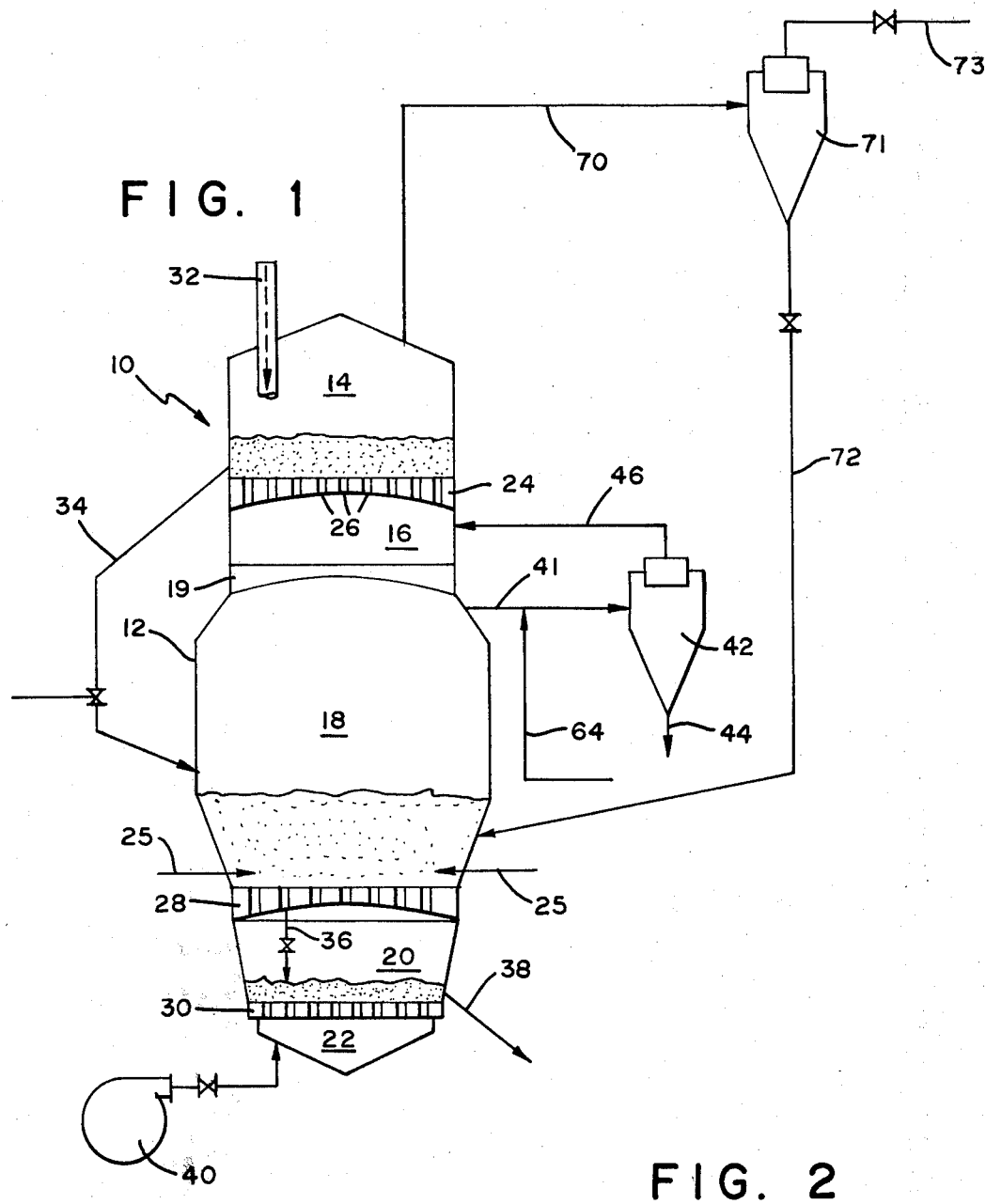

United States Patent [19]

Leyshon

[11] 3,998,929
[45] Dec. 21, 1976

[54] FLUIDIZED BED PROCESS

[75] Inventor: David W. Leyshon, Westport, Conn.

[73] Assignee: Dorr-Oliver Incorporated, Stamford, Conn.

[22] Filed: Oct. 30, 1972

[21] Appl. No.: 302,078

[52] U.S. Cl. .............................. 423/167; 432/15; 432/58; 432/77; 423/659; 23/277 R
[51] Int. Cl.² ....................... C01F 1/00; C01F 5/00; C01F 11/00
[58] Field of Search .......... 423/166, 167, 168, 171, 423/172, 173, 175, 176, 177, 316, 317, 318, 319, 320, 1, 659; 71/47, 53; 432/14, 15, 58, 77, 79; 34/57 A

[56] References Cited
UNITED STATES PATENTS

| | | | |
|---|---|---|---|
| 2,639,132 | 8/1948 | Bradford | 432/58 |
| 2,801,900 | 8/1957 | Benning et al. | 423/551 |
| 3,139,726 | 7/1964 | Wilson et al. | 60/39.02 |
| 3,266,788 | 8/1966 | Jukkola | 423/320 |
| 3,316,334 | 4/1967 | Walen et al. | 432/79 |
| 3,645,513 | 2/1972 | Deussner | 34/57 A |
| 3,758,266 | 9/1973 | Retali et al. | 432/14 |
| 3,796,791 | 3/1974 | Nielsen et al. | 432/175 |
| 3,872,211 | 3/1975 | Wall | 423/167 |

FOREIGN PATENTS OR APPLICATIONS

142,290   7/1948   Australia .......................... 423/659

OTHER PUBLICATIONS

Chemical Engineering Catalog – 1970, p. K-30.
Chemical Engineering (Magazine); July 9, 1962, pp. 125–132; FIG. 7.

Primary Examiner—Herbert T. Carter
Assistant Examiner—Eugene T. Wheelock
Attorney, Agent, or Firm—H. M. Snyder; Burtsell J. Kearns; Theodore M. Jablon

[57] ABSTRACT

Hot gases for fluidizing the preheat compartment of a multi-bed fluid bed reactor are cooled by injection of water, or cool air and water, to reduce scaling of the ducts, hot cyclone, hot windbox and the tuyeres in the constriction dome separating the hot windbox from the preheat compartment.

7 Claims, 2 Drawing Figures

U.S. Patent    Dec. 21, 1976    3,998,929

FLUIDIZED BED PROCESS

This invention is directed to an improved fluid bed calcining process, and, particularly, to a system in which hot fluidizing gases generated in the process are cooled prior to use.

Phosphate rock is found in many places in the world in deposits of varying composition. In order to prepare the phosphate rock for making phosphoric acid, which is then utilized in subsequent reactions; i.e., the manufacture of triple superphosphate and for other valuable products, it is sometimes necessary to beneficiate the phosphate rock by removing certain of the impurities. Very often a substantial amount of limestone ($CaCO_3$) is associated with the phosphate rock and a calcining operation is indicated to drive off the $CO_2$, leaving lime (CaO), which may then be removed by slaking and separating. In this way, a substantial beneficiation of the phosphate rock is effected.

One commercial method for the calcination of phosphate rock employs a multi-compartment fluidized bed reactor. In this process, finely divided phosphate rock is dried in a first fluidized bed and is then transported to a second fluidized bed where calcination takes place at a higher temperature. Commonly, the two fluidized beds are provided in a single reactor vessel with the drying compartment at the top of the vessel and the calcination compartment below, with means for passing dried material from the first compartment into the calcination compartment. Each such compartment has its own windbox for the fluidizing gases and the gas flows in a direction opposite to that of the solids undergoing treatment in that the gas serves first to fluidize the solids in the calcination compartment and then is routed through means for removing entrained solids to the windbox of the upper compartment where it then serves to fluidize the solids being dried.

In general, this system for treating phosphate rock is remarkably effective and efficient and has found wide acceptance. However, the off-gases of the calcination compartment which are used as the fluidizing gases for the drying compartment are ordinarily at the relatively high temperature of from about 650° C to about 1100° C. These gases have a certain amount of entrained fines which become "sticky" at elevated temperatures and produce scale deposits on surfaces contacted. Depending on the type of phosphate rock undergoing calcination, scaling can be severe at temperatures as low as about 550° C, while, in other cases, significant scaling is not observed at temperatures as high as about 800° C. The high temperature of the gases from the calcination compartment frequently results in heavy scaling of the cyclone, the following windbox and, particularly, the tuyeres which conduct the fluidizing gas from the windbox into the drying compartment. The scale is built-up by clay-like amorphous particles, which are sticky at elevated temperatures, hardening to a rock-like or ceramic deposit. When cleaning of these components is required, the reactor must be shut down and a jackhammer used to remove the scale from the cyclone and windbox surfaces, while the tuyeres must be drilled out.

Cooling of the off-gases of the calcination compartment by mixing with air at ambient temperatures has been conventionally used to reduce the scaling. This has the disadvantage of requiring a large volume of quench air which results in a high power requirement for injecting the cooling air. A fan for providing this cooling area may have a rating of 200 or more horsepower.

Accordingly, there is a very real need for a process in which the fluidization gases for the drying compartment can be cooled in a mechanically reliable way without greatly increasing the total air volume which must be moved and the power which is consumed per ton of product.

It is the object of this invention to reduce scaling of components exposed to the hot gases flowing to the preheat compartment of a multi-compartment fluidized bed reactor.

It is another object of this invention to effect cooling of the off-gases of a fluidized bed calciner in a novel manner.

Figure 2:
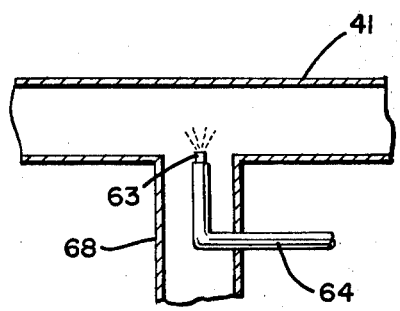

Other objects and advantages of the invention will become apparent from the following description taken in conjunction with the accompanying drawings in which:

FIG. 1 is a diagramatic representation of a multichamber fluidized bed reactor system adapted to carry out the present invention, and FIG. 2 is a view, partly in section, of a mixing tee useful in carrying out this invention.

Generally speaking, the invention is directed to a process in which the off-gases from the calcining compartment of a multi-compartment fluid bed reactor are cooled prior to passage through a hot cyclone and hot windbox as a fluidizing gas for the preheat or drying compartment. More particularly, the cooling of the off-gases is accomplished by the injection of water, or air and water, into the conduit carrying the hot off-gases to the preheat compartment.

Fluidized bed reactors of the type illustrated in FIG. 1 are basically vertical furnaces which are divided by a transverse, horizontally extending, gas permeable constriction plate into a windbox compartment below the plate and a heat treatment compartment above the plate. A bed of feed material to be treated is supported on a plate and is maintained in a fluidized state by air, or other oxygen-containing gas, which is introduced through the constriction plate into the bed. The pressure of the fluidizing gas causes the solids to take on the appearance and many of the properties of a boiling liquid, i.e., a fluid level is present, there is almost instantaneous heat transfer and equalization of temperature throughout the bed, and the particles are constantly changing position relative to each other. The constant flux and movement of the bed particles brings the particles into contact with each other and exposes the surface of the particles to the fluidizing gases so that an accelerated and complete reaction occurs in the bed.

While in some instances the oxidation or combustion carried on in the heat treatment compartment is autogenous, in other cases it is necessary and desirable to add an auxiliary fuel, usually gas or liquid, to the bed to maintain the reaction temperature at the desired level. Solids to be treated are fed into the upper portion of the fluidized bed and the calcine products are removed from the bottom portion of the bed. The products of combustion are discharged from the top section of the heat treatment or calcining compartment and from there can be used to preheat incoming solids.

Referring now to the calcining system shown in FIG. 1, the fluid bed reactor 10 can consist of a shell 12, a preheat compartment 14, a hot windbox 16, a calcining compartment 18, a cooling compartment 20, and a cold windbox 22. The preheat compartment 14, and the hot windbox 16, are separated from each other by a transverse constriction dome 24, having a plurality of orifices or tuyeres 26, a roof 19 isolates the calcining compartment 18 from the hot windbox 16. Calcining compartment 18, cooling compartment 20, and cold windbox 22 are spaced apart from each other by constriction plates 28 and 30.

The material to be treated, having been reduced to a predetermined particle size, is fed into the top of preheat compartment 14 by means well known in the art, such as conduit 32. After absorbing a desired amount of heat in a manner to be presently described, the solids are transferred by gravity through conduit 34 into calcining compartment 18. Fuel guns 25 introduce hydrocarbon fuel into the calcining compartment 18, the combustion of which provides the heat required for the calcining reaction. As the solids are reduced to calcine in compartment 18, they are transferred, again by gravity, through conduit 36 into cooling compartment 20 for subsequent discharge out of the reactor, through conduit 38.

Air is fed into cold windbox 22 by fan 40 and flows upward through construction plate 30 to cooling compartment 20 and through constriction plate 28 to calcining compartment 18. The rising air is in direct heat transfer in cooling compartment 20, absorbing heat from the calcined solids, thereby cooling the solids, as it fluidizes and passes through the bed. The preheated air then fluidizes the bed and supplies the oxygen for burning the fuel to provide the heat required in the calcination reaction in compartment 18. The spent fluidizing gas, now at a high temperature in the range from about 650° C to about 1100° C, rises into the freeboard space above the bed in calcining compartment 18 carrying with it fine solids and dust for discharge through conduit 41 into hot cyclone 42. A separation occurs in the hot cyclone 42 with most of the fine solids going to discharge through apex conduit 44, and the hot gases are conducted to the hot windbox 16 of the reactor through conduit 46 to supply the fluidizing gas for the bed in preheat compartment 14.

The off-gases of the preheat compartment 14 pass off through conduit 70 to the cyclone 71 where separation occurs with the gases discharging through conduit 73 and the solids and dust returning to the calcining compartment 18 through conduit 72.

At the point in the process where the hot gases from the calcining compartment pass sequentially into and through conduit 41, hot cyclone 42, conduit 46, hot windbox 16 and tuyeres 26, the temperature of the gas is so high (650° C–1100° C) that a problem with severe scaling of this equipment occurs. The fine particles entrained in the gas are soft and extremely sticky and adherent solids are deposited heavily and accumulate on the structures through which the gas passes. In situations of this type, it is very desirable to reduce the gas temperature to about 800° C or lower; and in some cases, the temperature of the gas must be reduced to about 500° C. It has been found the provision of a cooling station at which the injection of water into line 41 through line 64, or the injection of air and water through lines 64 and 68 as shown in FIG. 2, can be carried out is effective to lower the temperature of the gases so that scaling of the tuyeres and other equipment is drastically reduced or eliminated.

When air and water are injected together, the injection apparatus may advantageously be arranged so that the cool injected air shrouds the water pipe and nozzle which would otherwise be exposed to 650° C to 1100° C temperature conditions. Vaporization of water is the predominant cooling mechanism. FIG. 2 shows a structure of this type with conduit 68 provided to conduct the quenching air into conduit 41. The water conduit 64 and the nozzle or spray head 63 are well protected from the high temperature gases flowing in conduit 41 by the cool air streaming about them in conduit 68. The amounts of air and water added to the off-gases are adjusted to provide the necessary cooling.

It may also be desirable in some cases to employ a sonic atomizing nozzle of the type described in the paper, "The Cooling of Gaseous Effluents Using Sonic Atomizing Nozzles" by Korn, Muir and Kurylco, The Metallurgical Society of AIME (1972), for introducing water into the hot gas stream. Extremely fine water droplets are produced by such a nozzle and these droplets are rapidly evaporated to improve the cooling efficiency of the system.

For the purpose of illustrating the advantages of the inventions, to those skilled in the art, the following examples are given:

EXAMPLE I

In a calcining system of the type shown in FIG. 1, 44 TPH (tons per hour) of North Carolina phosphate rock (dry basis) is calcined. The flow of off-gases from the calcination compartment amounts to 53,800 CFM (cubic feet per minute) at a temperature of about 850° C. This gas is cooled by the addition of about 15 gallons per minute of water sprayed directly into the conduit conducting the gas toward the hot cyclone. The cooled gases going through the cyclone, ducts, hot windbox and tuyeres amounts to about 52,300 CFM at about 500° C. This temperature is well below the temperature where scaling becomes severe for this particular phosphate rock. It will be noted that the quantity of gas which must be accommodated and treated is less than the volume of calciner off-gases.

EXAMPLE II

In a calcining system of the general type shown in FIG. 1, but where the mixing tee of FIG. 2 is employed to introduce a mixture of cooling water and air into the hot off-gases of the calcining compartment, 44 TPH of North Carolina phosphate rock (dry basis) is calcined. The flow of off-gases from the calcination compartment, which amounts to 53,800 CFM at a temperature of about 850° C, is cooled by the addition of 10.8 gallons per minute of water from a spray pipe shrouded by 3900 SCFM (cubic feet per minute at standard conditions of temperature and pressure) of cooling air at ambient temperature (20° C–35° C). The cooled gas moving through the cyclone, ducts, hot windbox and tuyeres amounts to about 53,200 CFM at about 500° C, a temperature safely below that at which scaling becomes a problem with this phosphate rock.

In this second Example, approximately two-thirds of the cooling effect is accomplished by the water introduced, and the remaining third of the cooling is effected by the dilution with ambient air.

It will be appreciated that if air alone were employed to bring about the cooling of the calciner off-gases, a total volume of 11,600 SCFM of air would be required, with a consequent substantial increase in the power needed to inject this large volume of air.

There has thus been provided a relatively simple and inexpensive process for reducing the temperature of calciner off-gas and thereby reducing the scaling of the tuyeres and other equipment which deliver fluidizing gas to the preheat compartment.

Although the present invention has been described in conjunction with preferred embodiments, it is to be understood that modifications and variations will be resorted to without departing from the spirit and scope of the invention as those skilled in the art will readily understand. Such modifications and variations are considered to be within the purview and scope of the invention set forth in the appended claims.

I claim:

1. A calcining process for the treatment of particulate phosphate rock in a succession of fluidized beds comprising, fluidizing and treating the material at an elevated temperature in a preheat compartment, transferring the material to a fluidized bed calcining compartment for treatment at a higher temperature of at least about 650° C, injecting fuel into said fluidized bed calcining compartment to maintain said temperature, conducting the hot off-gases from said calcining compartment through an external conduit to a cooling station at which water is injected into the gas stream to cool the gases to a temperature below that at which deleterious scaling occurs, passing the cooled gases through a cyclone to remove entrained solids and employing the cooled and cleaned gas as the fluidizing gas for said preheat compartment.

2. The process of claim 1 wherein the hot fluidizing gases from said calcining compartment prior to cooling are at a temperature in the range from about 650° C to about 1100° C.

3. The process of claim 2 wherein the fluidizing gases entering said preheat compartment following water injection are at a temperature in the range from about 500° C to about 800° C.

4. The process of claim 3 wherein a quantity of air at ambient temperature is introduced into the hot off-gases with the water, replacing part of the water required, to reduce the temperature of the fluidizing gases.

5. A fluidized bed reactor system for calcining particulate phosphate rock, comprising preheat and calcining treatment compartments each containing a fluidized bed of material undergoing treatment, said calcining treatment compartment having a freeboard volume over said fluidized bed therein, a windbox space between said treatment compartments for receiving fluidizing gas for said preheat compartment, a plurality of tuyeres between said windbox and said preheat compartment to conduct the fluidizing gas into said preheat compartment, a cyclone separator having cooperating gas conduits for removing solids entrained in the fluidizing gas as it passes therethrough, a first of said conduits connecting said cyclone to said freeboard volume, a second of said conduits connecting said cyclone to said windbox space, and water injection means for introducing water directly into the gas stream flowing in the first of said conduits for cooling the fluidizing gases, whereby deleterious scaling in the cyclone, windbox and tuyeres is avoided.

6. A fluidized bed reactor system in accordance with claim 5 having air injection means for introducing a quantity of air at ambient temperature with the water into the conduit conducting the hot gases to the cyclone.

7. A fluidized bed reactor system in accordance with claim 6 wherein said air injection means is constructed and arranged to direct the air flow about said water injection means to thereby shield said water injection means from the hot gases flowing in said conduit.

* * * * *